Jan. 24, 1928.  1,656,942
C. F. DRUMM, JR., ET AL
MOTOR VEHICLE CONSTRUCTION
Filed Dec. 3, 1925  2 Sheets-Sheet 1
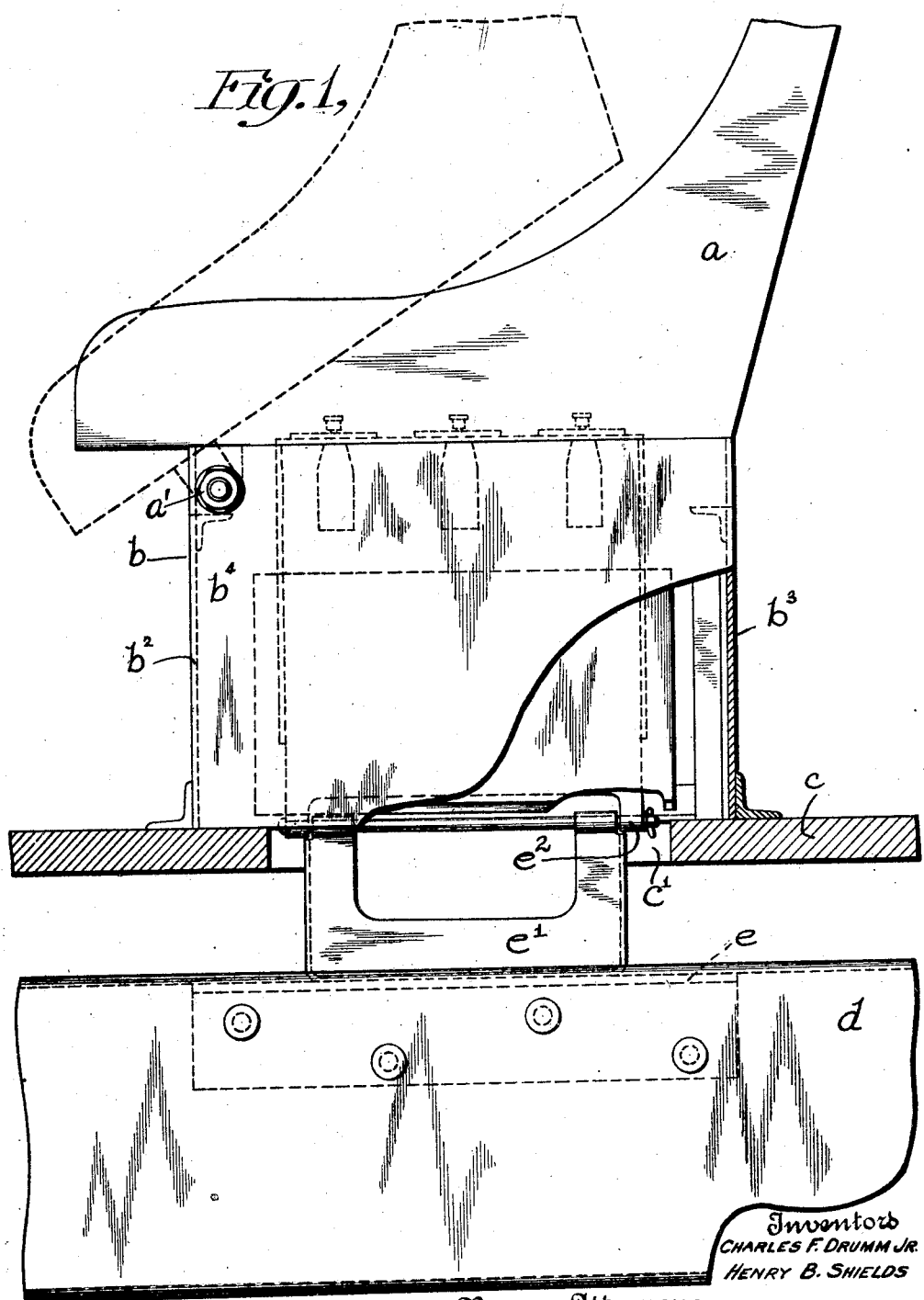
Fig. 1,
Inventors
CHARLES F. DRUMM JR.
HENRY B. SHIELDS
By their Attorneys
Redding Greeley O'Shea & Campbell

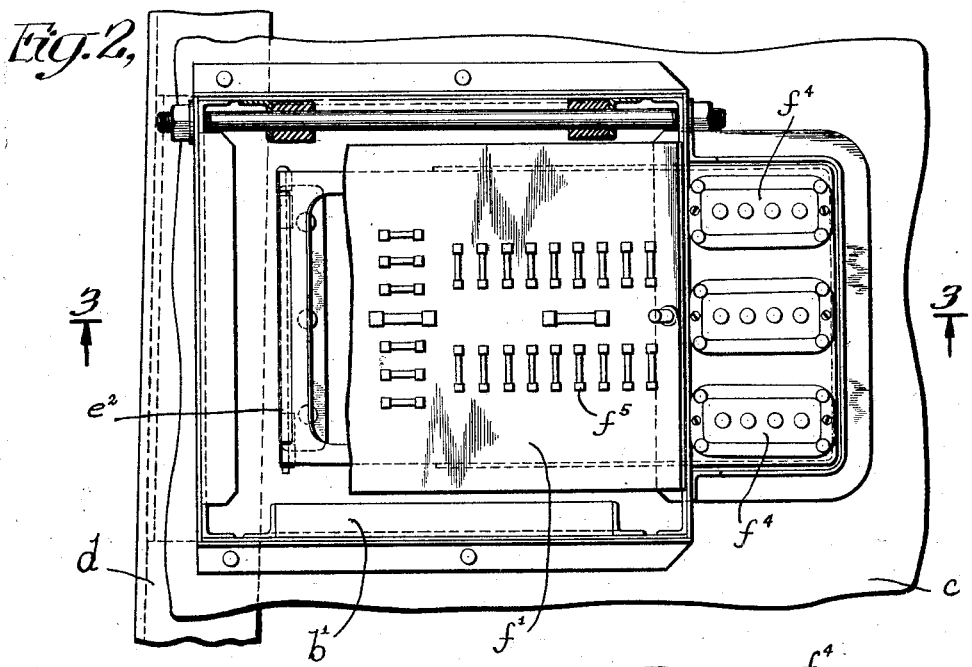
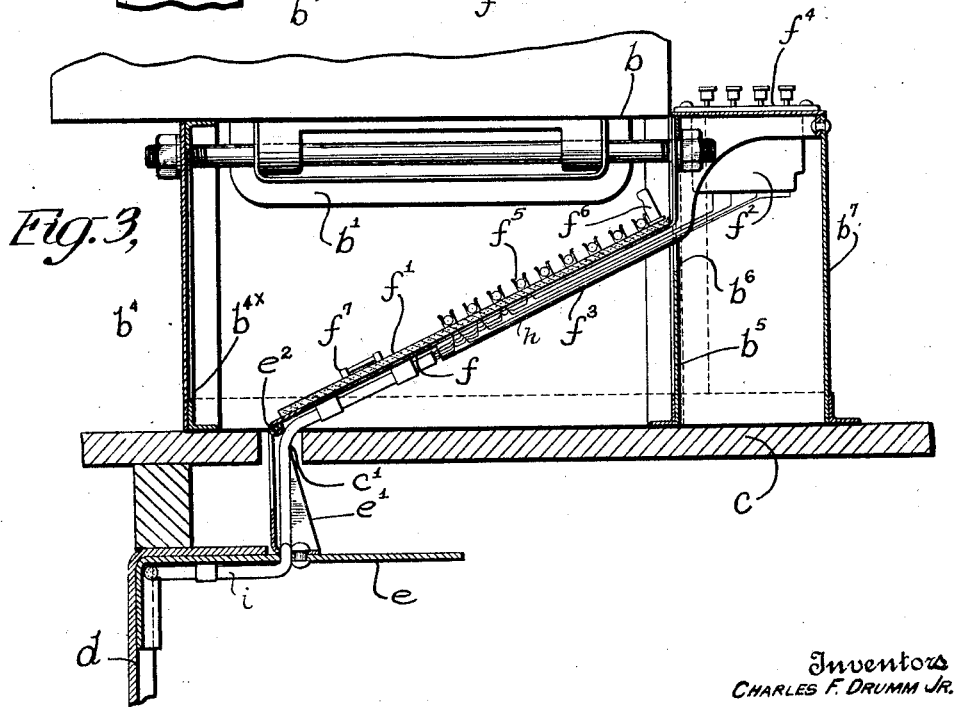

Patented Jan. 24, 1928.

1,656,942

UNITED STATES PATENT OFFICE.

CHARLES F. DRUMM, JR., OF ASTORIA, AND HENRY B. SHIELDS, OF FREEPORT, NEW YORK, ASSIGNORS TO INTERNATIONAL MOTOR COMPANY, OF NEW YORK, N. Y., A CORPORATION OF DELAWARE.

MOTOR-VEHICLE CONSTRUCTION.

Application filed December 3, 1925. Serial No. 72,933.

Under present day practice in motor vehicle construction the fuse and junction block and other switches controlling the various electric circuits throughout the vehicle are carried upon the dash board or other part of the body where they are accessible but disposed so as not to interfere with the operation and use of the vehicle. The vehicle body is removable from the chassis frame while the electric wiring connecting the fuse and junction block and the like with the head and tail lights and the other electrical devices associated with the engine are supported directly upon the frame and hence not readily removable therefrom. It is thus frequently necessary when affixing or removing the body of the vehicle to cut the various electrical circuits, necessitating considerable labor and skill in their reinstatement. The object of the present invention is to so dispose the fuse and junction block and the switches and fuses and switch and fuse wiring at a centralized point for the distribution of wires for the chassis and body in such manner that independent connections and disconnections of all chassis and body wires may be readily effected and the chassis may be completely wired and all instruments and electrical equipment inserted in proper location at the factory. The body can there be mounted and the body wires connected to terminals provided without disturbing the chassis wiring in any manner. Thus the body circuits when connected to proper terminals will be fused and connected to the proper switch in simple and expeditious manner. More particularly the invention involves a switch and fuse block which may be assembled and wired on the bench at the factory as a unit and which is adapted to be hingedly supported from the chassis in such manner that the wiring can be inspected or repaired without removing same from its mounting. One aspect of the invention involves the mounting of a unitary switch and fuse block directly upon the chassis frame by a hinged connection and forming the driver's seat base as a housing within which the block is disposed, the switches being accessible by the arrangement of the switchboard at the side of the driver's seat and the fuse block and connections therewith being accessible preferably by merely raising the seat off the base.

In order that the invention may be clearly understood and readily carried into effect the same will now be described more fully with reference to the accompanying drawings forming a part hereof, in which:

Figure 1 is a view in side elevation showing the base for a driver's seat and the unitary switch and fuse block hingedly connected to the chassis frame.

Figure 2 is a view looking from above and showing the fuse and switch block with the switches accessible from the side of the driver's seat, parts being removed in the interest of clearness.

Figure 3 is a transverse vertical view showing the switch and fuse block disposed within the driver's seat base taken in the plane indicated by the line 3—3 in Figure 2 and looking in the direction of the arrows.

A driver's seat is indicated at $a$ and is supported upon a seat base $b$ carried in any convenient manner upon a section $c$ of the floor of the vehicle. The floor $c$ may be removably supported in any convenient manner (not shown) from the chassis frame of the vehicle. A longitudinal side frame member of the chassis is indicated at $d$ and there is shown as secured thereto a bracket $e$ having an upright flange $e'$ extending through an aperture $c'$ in the floor of the vehicle. Hingedly connected as at $e^2$ to the flange $e'$ is the unitary switch and fuse block $f$ comprising a fuse panel $f'$ to which the hinge is secured and a switch box $f^2$ which may be secured to the fuse panel by brackets $f^3$. The fuse panel is adapted to lie within the base $b$ at an angle to the floor while the switchboard is substantially parallel with the floor for ready access at the side of the driver of the vehicle. The seat base $b$ may be formed with a seat receiving portion $b'$ adapted to support the seat $a$ and may be substantially rectangular in shape and formed of the front and rear walls $b^2$, $b^3$ and the side walls $b^4$, $b^5$. Side wall $b^5$ is illustrated as formed with a cut-out portion as at $b^6$ through which the brackets $f^3$ extend and outwardly of the cut-out portion $b^3$ there is formed a housing $b^7$ rigid with the base and having an open top through which the switch panel $f^4$ extends. The wall $b^4$ may be formed with an opening $b^{4x}$ which may be closed by a hinged door whereby access to the interior of the seat base is afforded to change the fuses $f^5$, for instance. It is preferred, however, to hinge the driver's seat to the front of the base as at $a'$, so that by tipping the seat forward about the pivot $a$ the fuses are disclosed to view and by then swinging the fuse block about the pivot $e^2$ the wiring as at $h$ is easily accessible. A pilot light $f^6$ is provided to illuminate the face of the fuse block and clips $f^7$ may also be provided for spare fuses. Racks may also be disposed along the interior walls of the seat base for tools, lunch boxes and the like.

By the construction just disclosed the main electric circuits for the vehicle may be accommodated in a cable $i$ carried with the chassis frame member $d$ and from this cable may extend to the fuse and switch block through the aperture $c'$ in the floor. The fuse and junction block and the switches and fuses and switch and fuse wiring are always accessible at a centralized point from which the wires for the chassis and body are distributed and independent connections and disconnections of all body and chassis wires are afforded. The chassis may be completely wired and all instruments and electrical equipment installed in proper location at the factory and the body may be mounted and the body wires connected to terminals provided without disturbing the chassis wiring in any way. The body circuits when connected to proper terminals may be fused and connected to the proper switch and the load readily recorded on an ammeter for testing. The junction block binding posts may be numbered and a corresponding number attached to the lead wire therefrom whereby the connections and disconnections may be made fool proof. The construction according to the invention permits the switch and fuse black to be assembled and wired on the bench and mounted as a unit and may be so hinged to the chassis frame that the wiring may be inspected or repaired without removing the same from its mounting. The housing or seat base, in addition, forms a convenient location for racks or receptacles for tools, spare fuses, light bulbs and lunch boxes, etc.

Various modifications may be made in the arrangement or configuration of the device as a whole and no limitation is intended by the illustrations or description except as indicated in the accompanying claim.

What we claim is:

In a motor vehicle having a chassis frame and a vehicle body with a floor supported thereon, an opening in the floor, a seat hinged upon the body above said opening, wiring on the chassis frame, a fuse block hingedly supported directly on the chassis frame beneath the seat and extending through said opening and carrying electrically connected fuses, brackets secured to the fuse block and carrying an independent and unitary switch block, and wiring between the fuses and the switches and the wiring on the chassis frame whereby the fuse and switch structure will be carried as a unit upon the chassis frame independently of the body.

This specification signed this 25 day of November, A. D. 1925.

CHARLES F. DRUMM, JR.
HENRY B. SHIELDS.